United States Patent [19]
Huang et al.

[11] Patent Number: 5,301,008
[45] Date of Patent: Apr. 5, 1994

[54] OPTICAL CROSSBAR EXCHANGE ARRANGEMENT

[75] Inventors: Alan Huang, Middletown; Norman A. Whitaker, Jr., Atlantic Highlands, both of N.J.

[73] Assignee: AT&T Bell Laboratories, Murray Hill, N.J.

[21] Appl. No.: 65,516

[22] Filed: May 20, 1993

Related U.S. Application Data

[63] Continuation of Ser. No. 787,989, Nov. 5, 1991, abandoned.

[51] Int. Cl.$^5$ .................................................. G01B 9/02
[52] U.S. Cl. ........................................ 356/345; 385/16
[58] Field of Search ............... 356/345, 350; 385/14, 385/16; 250/227.19, 227.27

[56] References Cited

U.S. PATENT DOCUMENTS

| | | | |
|---|---|---|---|
| 4,761,050 | 8/1988 | Byron | 359/16 |
| 4,962,987 | 10/1990 | Doran | 359/16 |
| 4,973,122 | 11/1990 | Cotter et al. | 359/16 |
| 4,995,690 | 2/1991 | Islam | 359/16 |
| 5,144,375 | 9/1992 | Gabriel et al. | 356/345 |

OTHER PUBLICATIONS

"Ultrafast switching with a single-fiber interferometer," M. J. LaGasse, et al., *Optics Letters*, vol. 14, No. 6, (Mar. 15, 1989).

"Ultrafast, low power, and highly stable all-optical switching in an all polarization maintaining fiber Sagnac interferometer," M. Jinno, et al., (Apr., 1990).

"Soliton switching in a fiber nonlinear loop mirror," M. N. Islam et al., *Optics Letters*, vol. 14, No. 15, (Aug. 1, 1989).

*Primary Examiner*—Samuel A. Turner
*Attorney, Agent, or Firm*—John A. Caccuro

[57] ABSTRACT

An optical crossbar exchange arrangement is implemented using a modified Sagnac switch. During the absence of a control signal, two separately numbered inputs are coupled to the same numbered outputs of the Sagnac switch (i.e., input1 to output1, etc.). During the presence of a control signal each of the two numbered inputs are switched and are coupled to a different numbered output (e.g., input1 to output2, etc.).

20 Claims, 3 Drawing Sheets

OPTICAL CROSSBAR EXCHANGE ARRANGEMENT

This application is a continuation of application Ser. No. 07/787,989, filed on Nov. 5, 1991, now abandoned.

CROSS-REFERENCE TO RELATED APPLICATION

Related subject matter is disclosed in the following applications filed concurrently herewith and assigned to the same assignee hereof: U.S. patent application Ser. No. 07/787,988, entitled "Optical Circulating Shift Register" inventors Hercules Avramopoulos, M. Christina Gabriel, Alan Huang and Norman Ashton Whitaker, Jr.; and U.S. patent application Ser. No. 07/787,985, entitled "Optical Linear Feedback Shift Register" inventors Hercules Avramopoulos, Alan Huang and Norman Ashton Whitaker, Jr.

BACKGROUND OF THE INVENTION

This invention relates to high-speed optical digital circuits and, more particularly, to an optical crossbar exchange arrangement.

To effectively utilize the greater bandwidth inherent in optical signals, it is necessary to develop logic devices and circuits that use all-optical components. Recently, all-optical logic devices have been developed utilizing a Sagnac interferometer in a variety of arrangements to accomplish the switching function. Illustrations of these devices are described in the following articles:

"Pulsed-Mode Laser Sagnac Interferometry with Applications in Nonlinear Optics and Optical Switching", Applied Optics, Vol. 25, No. 2, January 1986, pp. 209-214, Li et al.; "Soliton Switching in a Fiber Nonlinear Loop Mirror", Optics Letters, Vol. 14, No. 15, Aug. 1, 1989, pp. 811-813, Islam et al.; "Optical Fiber Switch Employing a Sagnac Interferometer", Applied Physics Letters, Vol. 55, pp. 25, 1989, Farries et al.; "Ultrafast, low power, and highly stable all-optical switching in an all polarization maintaining fiber Sagnac interferometer," Conference record of April 1990 topical Meeting on Photonic Switching, paper 13C-16, M. Jinno and T. Matsumoto.

Notwithstanding these latest advancements, there is a continued need to improve existing all-optical logic devices and to develop new all-optical logic devices.

SUMMARY OF THE INVENTION

In accordance with the present invention an optical crossbar exchange arrangement is implemented using a modified Sagnac loop. The modified Sagnac loop includes means for injecting two input signals into the loop and developing, for each input signal, an interacting signal and a reference signal that travel along the loop in opposite directions. The Sagnac loop also includes a coupler to inject a first control signal into the loop to travel through the loop only in one direction. The loop includes a material that has a controllable propagation speed. The propagation speed of optical signals in this loop material is a function of one or more of the parameters of the signal that travels through it, such as intensity, polarization, and wavelength. In this loop material, the propagation speed of one signal is affected by the concurrent flow of another signal. The switch action of the Sagnac loop is attained when the applied signals are in the form of pulses, and in particular, when the relative pulse propagation speed is such that a control pulse can either traverse, or be traversed by, an interacting or reference signal traveling in the same direction in the loop.

The invention utilizes these facts to advantage in its operation. When a first and a second input signals are injected, via a first and second input ports, respectively, into the loop, the reference and interacting signals for each input signal travel the loop in opposite directions. When a control signal is absent, the reference and associated interacting signals for each input signal are interferometrically combined to create a reflected signal at the input port where the input signal was originally received. This reflected signal is then outputted at an associated output port. Thus, when the control signal is absent, an input to the first input port is coupled to a first output port and an input to the second input port is coupled to a second output port. When the control signal is present, however, the reference and associated interacting signals for each input signal combine to create a non-reflected signal which is outputted at an output port not associated with the original input port. That is, when the control signal is present, an input to the first input port is coupled to the second output port and an input to the second input port is coupled to the first output port. The result is that the arrangement exhibits a crossbar exchange operation on the two input signals depending on the presence or absence of the control signal.

DETAILED DESCRIPTION

Figure 1:
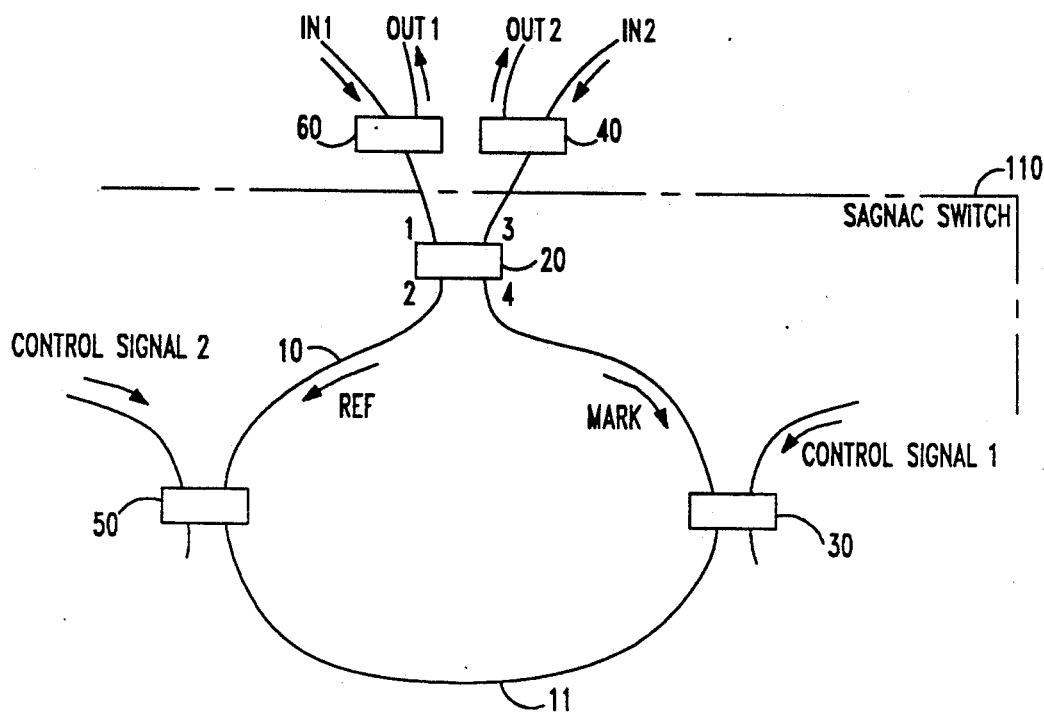
FIG. 1 illustrates a first embodiment of an optical crossbar exchange arrangement.

Shown in FIG. 1 is an illustrative diagram of our inventive optical crossbar exchange arrangement implemented using a modified Sagnac interferometer loop arrangement 110 (hereinafter Sagnac switch). Before describing the operation of the present invention we first note that a Sagnac switch is described in more detail in the co-pending U.S. patent application Ser. No. 07/521,774 of Gabriel, Houh and Whitaker entitled "Sagnac Optical Logic Gate," filed May 10, 1990, which is incorporated by reference herein.

The present invention, illustratively, includes an optical transmission medium, illustratively and hereinafter, an optical fiber 10, that is connected to ports 2 and 4 of coupler 20. Fiber 10 thus forms a loop, (also referred to herein as fiber loop 10) which in the context of this disclosure, refers to the path over which a signal travels and, more particularly, to arrangements where the path forms a closed, or nearly closed, figure. As will be described in more detail in a later paragraph, fiber 10 has a segment 11 which is made of a controllable optical signal propagation speed material.

Coupler 60 enables a first input signal IN1 and a first output signal OUT1 to be coupled to port 1 of coupler 20. Similarly, coupler 40 enables a second input signal IN2 and a second output signal OUT2 to be coupled to port 3 of coupler 20. It should be noted that two circulators can be utilized, in an equivalent manner, in place of couplers 40 and 60.

Figure 2:
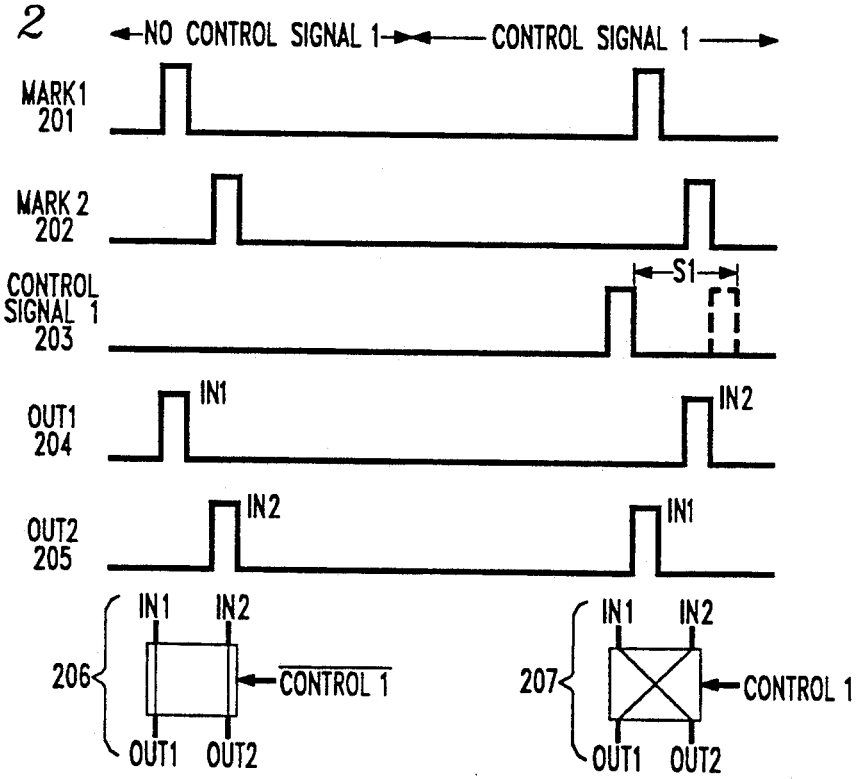
FIGS. 2 and 3 illustrate timing diagrams associated with FIG. 1.

The invention operates as follows. An input signal IN1 is coupled via coupler 60 to port 1 of coupler 20. In coupler 20 the signal is split into two parts that exit coupler 20 at ports 2 and 4: a "mark" signa; (interacting signal) that travels clockwise, and a "ref" signal (reference signal) that travels counter-clockwise. The "mark" and "ref" signals travel through the loop in opposite directions, re-enter coupler 20 and recombine therein. Under normal circumstances, the "mark" and "ref" signals experience the same conditions as they travel through the loop. Even though optical signal propagation speed is a function of many parameters that may be uncontrollable and may or may not change with time, the travel time of the "ref" and "mark" signals is short enough that, basically, all of the parameters remain static. Consequently, no changes occur within the loop to differentiate between the effects of the fiber on the signals traveling in the two directions. The result is a combining of signals in coupler 20 that is constructive with respect to port 1 and destructive with respect to port 3. In consequence, light that enters port 1 of coupler 20 is completely reflected back to port 1, and no output is delivered to port 3. Light that is reflected back to port 1, exits port 1, enters coupler 60 and exits as output OUT1. With reference to FIG. 2, 201 shows the "mark" signal (MARK1) of input signal IN1, 203 shows the absence of a control signal 1, and 204 shows output signal OUT1.

Returning to FIG. 1, in a similar manner, an input signal IN2 applied to coupler 40 is coupled to port 3 of coupler 20 and also split into a "mark and ref" signals that exit coupler 20 at ports 2 and 4. Again, the "mark and ref" signals travel the loop in opposite directions and recombine at coupler 20 in a manner that is constructive with respect to port 3 and destructive with respect to port 1. Consequently, light that enters port 3 of coupler is completely reflected back to port 3, and no output is delivered to port 1. This reflected light at port 3, exits port 3, enters coupler 40 and exits as output OUT2. With reference to FIG. 2, 202 shows the "mark" signal (MARK2) of input signal IN2, 203 shows the absence of a control signal1, and 205 shows output signal OUT2.

Figure 3:
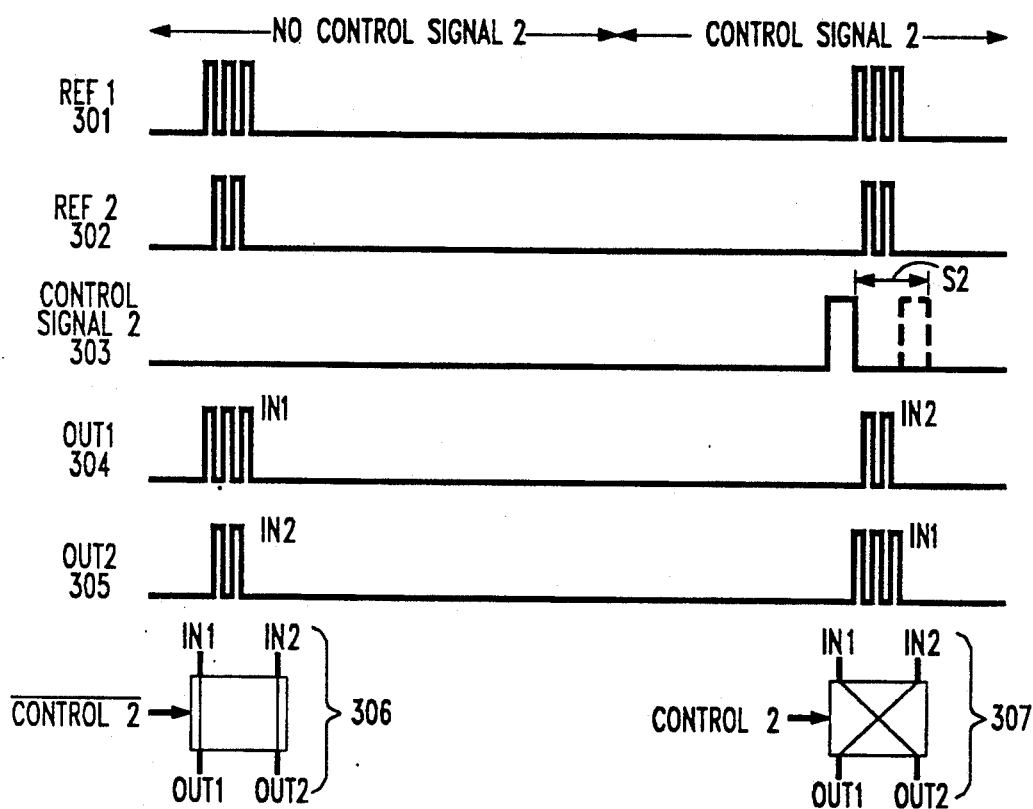

Thus, the arrangement circuit of FIG. 1, in the absence of control signal 1 operates to couple the signals IN1 and IN2 to OUT1 and OUT2, respectively, as shown by the illustrative equivalent circuit representation 206 of FIG. 2. Note, input signals IN1 and IN2 can have the same wavelength or may have different wavelengths. If the wavelengths and polarizations are the same, then to avoid interfering with each other they must be sent at different times as shown by 201 and 202 of FIG. 2. However, if input signals IN1 and IN2 have different wavelengths, then they can both be inputted simultaneously and they won't interfere with each other. This is shown in FIG. 3, which will be described in detail in a later paragraph.

Returning to FIG. 1, when the control signal is present, input signal IN2 entering port 3 exits via port 1 of coupler 20 to become output signal OUT1 of coupler 60. This is shown in FIG. 2, during the presence of control signal, by 201, 203 and 204. Similarly, input signal IN1 becomes output signal OUT2, as shown by 202, 203 and 205 of FIG. 2. The result is that the presence of the control signal causes crossbar exchange operation to occur between input signals IN1 and IN2 and output signals OUT1 and OUT2. This is shown by the cross connect pattern in the circuit representation 207 of FIG. 2.

The manner by which the control signal causes this time slot interchange (or optical cross connect capability) is described in the following paragraphs for the input signal IN1. (The same description also applies, in an equivalent manner, to input signal IN2). When the control signal (typically, a pulse) is present and is made to travel through segment 11 (the controllable propagation speed material) of fiber 10 with the "mark" signal, the resulting increase in propagation speed of the "mark" signal that is caused by the control signal alters the phase of the "mark" signal arriving at coupler 20.

Segment 11 of fiber 10 is a variable refractive-index material that is characterized by the property that the propagation speed of a beam passing through the material is a function of the energy of the beam that passes through the material. Furthermore, not only does the propagation speed change for the beam (e.g., control signal) that affects the change in propagation speed, but it also changes the propagation speed of other beams (e.g., "mark" signal) that pass through the material at the same time. The nonlinear interaction between the control signal and the "mark" signal is by means of cross-phase modulation due to the optical Kerr effect. Of course, the entire length of fiber 10 may be made of such a variable refractive-index material, but for the sake of generality, FIG. 1 is drawn with only a limited segment being made up of this material. Also for the sake of generality, it should be pointed out that the loop of fiber 10 in FIG. 1 does not necessarily have to to be fiber. It can be a waveguide, or other means for directing the flow of light.

When the energy in the control signal (the integral of the control pulse or pulses) and the interaction interval within segment 11 are properly controlled, the resulting phase relationship between the "mark" and "ref" signal is approximately $\pi$ radians, meaning that the "mark" signal is about 180° out-of-phase to the "ref" signal. This causes the combining of the "mark" signal and the "ref" signal in coupler 20 to be completely destructive with respect to port 1 and completely constructive with respect to port 3. As a result, all of the energy of input signal IN1 exits at port 3 (non-reflected signal output port) rather than at port 1 (reflected signal output port). It may be noted in passing that the "ref" signal also passes through segment 11 and that its speed is also somewhat affected by the control signal. But, since the control signal and the "ref" signal travel in opposite directions, their interaction time is much shorter than the interaction time of the "mark" and the control signals. The result is that the differential in speed enhancement between the "mark" and "ref" signal results in the approximately $\pi$ radians on 180° phase difference when those signals reach coupler 20.

To ensure the proper operation of the Sagnac switch (that is to minimize the distortion of the pulse which outputs at port 3) requires that the control signal completely traverse the "mark" signal during its transit through segment 11 of the fiber loop 10. This is accomplished by requiring that the controllable propagation speed material of segment 11 have a dual speed characteristic, one that propagates the control signal at a different rate than the "mark" signal. The difference in the propagation speed may be a function of any controllable parameter of the control signal, such as wavelength, intensity or polarization. As long as the control signal completely traverses (or slips past) the "mark" signal within segment 11 the Sagnac switch operation is completely insensitive to the shape of the control signal or its precise timing. This is because each and every part of the control signal interacts with each and every part of the "mark" signal. Hence, Sagnac switch operation is only sensitive to the overall energy of the control signal (integral of the control signal). Thus, if need be, the control signal may be one or more pulses to produce the overall energy needed.

With reference to 203 of FIG. 2, control signal requires at least a slip of S1 to traverse (or slip by) the "mark" signals of both input signals IN1 and IN2. That is, the differential in speed between the control signal and "mark" signal must result in the additional distance S1 being traveled by the control signal within segment 11. In general the control signal can be made to traverse individual pulses or groups or packets of input pulses. Thus, input signals IN1 and IN2 may, illustratively, represent an envelope of a packet of pulses (i.e., a plurality of pulses) rather than an individual pulse. This is shown in FIG. 3.

Returning to FIG. 2, when the control signal traverses the "mark" signal portion of input signal IN1, it speeds up the "mark" signal, so that the "mark" signal is out of phase with the "ref" signal. The result is that the "mark" and "ref" signals combine destructively at port 1 and constructively at port 3 of coupler 20. The result is that input signal IN1 exits as output OUT2. Similarly, when control signal traverses the "mark" signal portion of input signal IN2, it causes input signal IN2 to exit at output OUT1. Thus, the circuit of FIG. 1 performs a crossbar exchange operation which is switched on and off by a control signal.

In the present embodiment the control signal may utilize a different wavelength than the input signals or may have the same wavelength but a different polarization than the input signals. Thus, segment 11 may be appropriately selected to have a controllable parameter based on intensity alone, polarization alone, or on a combination of polarization and intensity parameters. The length of segment 11 must be selected together with the controllable parameter to ensure that the control signal can traverse or "slip" past the "mark" signal within the length of segment 11, even though the "mark" signal precedes the entrance of the control signal into segment 11.

With reference to FIG. 3, there is shown the example of input signals IN1 and IN2 having different wavelengths and being inputted substantially simultaneously to the arrangement of FIG. 1. In this example, the input signals IN1 and IN2 comprise, respectively, three pulses and two pulses. A control signal 2 is shown being applied via coupler 50. As shown with reference to FIG. 1, control signal 2 travels in the same direction as the "ref" signal and in the opposite direction to the "mark" signal.

Because input signals IN1 and IN2 are different wavelengths, then they can be applied and switched simultaneously by FIG. 1 producing a true optical cross connect function. No interference between the input pulse IN1 and IN2 would occur in FIG. 1, because the different wavelengths of light won't interfere with each other during combining in coupler 20.

Returning to FIG. 3, in the absence of control signal 2, input signal IN1 and IN2 become, respectively, output signals OUT1 and OUT2. During the presence of control signal 2, the "ref" signal for both IN1 and IN2 are traversed by control signal 2 (e.g., within segment 11, control signal 2 travels a distance which exceeds by S2 the distance traveled by the "ref" signals). Because the input pulses IN1 and IN2 utilize different optical wavelengths, they do not interfere with each other while traveling in loop 10. Moreover, coupler 20 is able to independently recombine the "mark" and "ref" signals of each input pulse IN1 and IN2 as though they did not arrive simultaneously thereat. Consequently, in a manner similar to that discussed in FIG. 2, the input pulses IN1 exit coupler 40 as OUT2 and input pulses IN2 exit coupler 60 as OUT1. Thus, the circuit of FIG. 1 also performs a crossbar exchange operation on input signals IN1 and IN2 when control signal 2 is present. Hence, if either control signal 1 or control signal 2 is present, the crossbar exchange operation on input signals IN1 and IN2 results.

If, however, both control signal 1 and control signal 2 are present, and have the same overall energy, then no crossbar exchange operation results on output signals IN1 and IN2. This occurs because control signal 1 alters the speed of the "mark" signals the same amount that control signal 2 alters the speed of the "ref" signals. As a result, the "ref" and "mark" signals of input signal IN1 combine constructively at port 1 of coupler 20 and combine destructively at port 3 of coupler 20. Similarly, the "ref" and "mark" signals of input signal IN2 combine constructively at port 3 and combine destructively at port 1 of coupler 20. Hence, input signal IN1 is coupled to OUT1 and input signal IN2 is coupled to OUT2.

Figure 4:
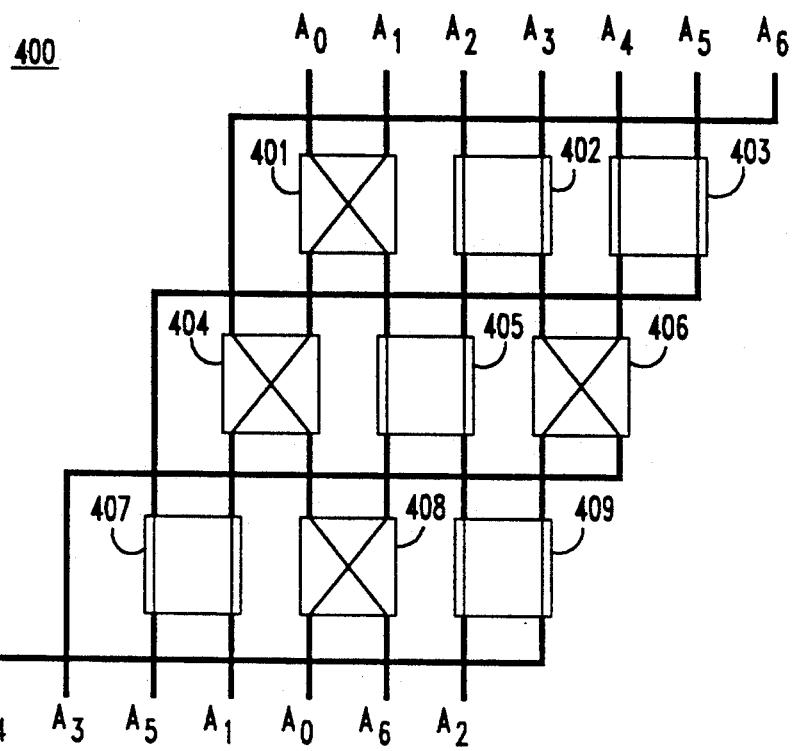
FIG. 4 shows a time slot interchanger utilizing a plurality of FIG. 1 arrangements.

Shown in 400 of FIG. 4 is an application including a number of FIG. 1 cross-connect circuits 401–409 illustratively arranged to implement a rasterized exchange/-bypass time slot interchanger. The time multiplexed input data stream A0–A6 is time slot interchanged or switched to become, illustratively, the output data stream A4, A3, A5, A1, A0, A6, A2. The presence of a control signal (not shown) to each of the cross-connect circuits 401, 404, 406 and 408 causes the cross-connection of the numbered inputs to different numbered outputs while the absence of a control signal (not shown) to cross-connect circuits 402, 403, 405, 407 and 409 cause the numbered inputs to connect straight through to the same numbered outputs.

Figure 5:
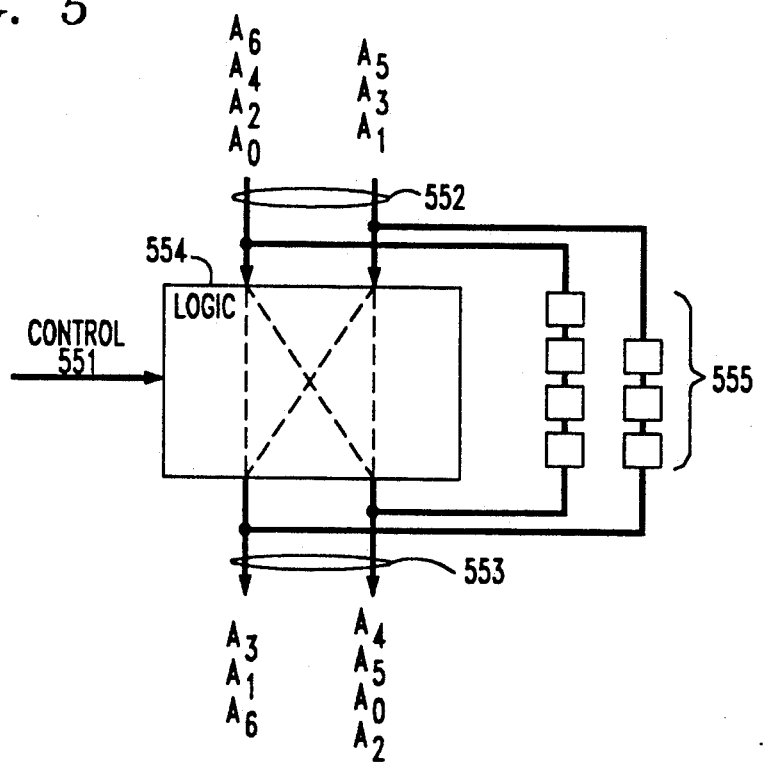
FIG. 5 shows a time sequential version of the time slot interchanger of FIG. 4.

Shown in FIG. 5 is a time sequential version of the interchanger 500. This version is implemented by folding the different rows and columns of circuits of FIG. 1 as described in U.S. Pat. No. 4,943,909 entitled "Computational Oragami" and issued to A. Huang on Jul. 24, 1990, and incorporated herein by reference. In FIG. 5, one cross-connect circuit of FIG. 3 becomes the logic circuit 554, and by time sharing this cross-connect circuit 554 under control of a time division multiplexed control signal 551, it performs all the switching required by circuits 401–409 of FIG. 3. Thus, the time sequence of inputs (A0–A6) 552 are interchanged to the time sequence at outputs 453 under control of control signal 551. The delay units 555 each provide one time slot interval of delay. These delay units 555 sequentially store the last 3 (or 4) time slot interval outputs that appeared on outputs 453 which are ultimately fed back as inputs 552.

It should be noted that the function of Sagnac switch 110 may be implemented using a Mach-Zehnder switch or other interferometer switch, using the Kerr effect, and arranged in an analogous manner to that disclosed herein.

What has been described is merely illustrative of the application of the principles of the present invention. Other arrangements and methods can be implemented by those skilled in the art without departing from the spirit and scope of the present invention.

We claim:

1. A crossbar exchange arrangement comprising
a transmission medium including a controllable propagation speed material;
first means for inputting a first signal into said medium, to develop both a first interacting signal that travels in said medium in one direction and a corresponding first reference signal that travels in said medium in the opposite direction;
second means for inputting a second signal into said medium, to develop both a second interacting signal that travels in said medium in one direction and a corresponding second reference signal that travels in said medium in the opposite direction;
means for injecting a control signal into said medium, that travels through said medium in the direction of said first and second interacting signals with the timing of said control signal in relation to said first and second interacting signals, controlled to traverse said first and second interacting signals by said control signal while said first and second interacting signals are traveling through said medium; and
means for combining each reference signal after its travel through said material with its corresponding interacting signal after its travel through said medium, to form first and second combined signals, wherein
when said control signal is absent, said first combined signal appears at a first output means and said second combined signal appears at a second output means and wherein
when said control signal is present, said first combined signal appears at said second output means and said second combined signal appears at said first output means.

2. The arrangement of claim 1 wherein said combining means develops said first and second combined signals at said first and second output means, respectively, when the signals combined at said combining means interfere constructively.

3. The arrangement of claim 1 wherein said combining means develops said first and second combined signals at said second and first output means, respectively, when the signals combined at said combining means interfere destructively.

4. The arrangement of claim 1 wherein said controllable propagation speed material is characterized by a propagation speed that is a function of one or more controllable signal parameters of said control signal.

5. The arrangement of claim 4 wherein said one or more controllable signal parameters is one or more parameters selected from a group including: wavelength of said control signal, polarization of said control signal, energy integral of said control signal, and intensity of said control signal.

6. The arrangement of claim 5 wherein said one or more controllable signal parameters is controlled to produce a phase shift of each interacting signal, as it travels said controllable propagation speed material with said control signal that is altered by substantially $\pi$ radians from the phase shift of each interacting signal as it travels said controllable propagation speed material without said control signal.

7. The arrangement of claim 5 wherein said one or more controllable signal parameter is controlled to produce substantially a 180 degree phase shift differential in each interacting signal as it passes through said controllable propagation speed material in one direction relative to the phase shift of each reference signal as it passes through said controllable propagation speed material in the other direction.

8. The arrangement of claim 1 wherein the controllable propagation speed material is such that signals of orthogonal polarization propagate at different speeds and where the propagation speed for a given polarization when a signal of orthogonal polarization is present differs from the propagation speed for that given polarization when the signal of orthogonal polarization is absent.

9. The arrangement of claim 8 wherein each interacting signal is polarized and said control signal is polarized, and the polarization of each interacting signal is orthogonal to the polarization of said control signal.

10. The arrangement of claim 1 wherein
said first and second input means are, respectively, a first and a second ports of a four-port coupler which connect, respectively, to a third and a fourth ports, the third and fourth ports also connect to different ends of said medium, said four-port controller also providing the combining function of said combining means.

11. The arrangement of claim 1 including
a first coupler including said first input means and said first output means and
a second coupler including said second input means and said second output means.

12. The arrangement of claim 1 including
a first coupler including said first input means and a first circulator means and
a second coupler including said second input means and a second circulator means.

13. A crossbar exchange arrangement comprising
a transmission medium including a controllable propagation speed material;
first means for inputting a first signal into said medium, to develop both a first interacting signal that travels in said medium in one direction and a corresponding first reference signal that travels in said medium in the opposite direction;
second means for inputting a second signal into said medium, to develop both a second interacting signal that travels in said medium in one direction and a corresponding second reference signal that travels in said medium in the opposite direction;
means for injecting a control signal into said medium, that travels through said medium in the direction of said first and second interacting signals with the timing of said control signal in relation to said first and second interacting signals, controlled to traverse said first and second interacting signals by said control signal while said first and second interacting signals are through said medium;
means for combining each reference signal after its travel through said material with its corresponding interacting signal after its travel through said medium, to form first and second combined signals; wherein
when said control signal is absent, said first combined signal appears at a first output means and second combined signal appears at a second output means; wherein when said control signal is present, said first combined signal appears at said second output means and said second combined signal appears at said first output means;

second means for injecting a second control signal into said medium, that travels through said medium in the direction of said first and second reference signals with the timing of said control signal in relation to said first and second reference signals, controlled to traverse said first and second reference signals by said control signal while said first and second reference signals are traveling through said medium; and wherein when both said control signal and said second control signals are present, said first combined signal appears at a first output means and said second combined signal appears at a second output means.

14. The arrangement of claim 13 wherein said second control signal includes at least one pulse.

15. The arrangement of claim 1 wherein said first signal includes at least one pulse.

16. The arrangement of claim 1 wherein said second signal includes at least one pulse.

17. The arrangement of claim 1 wherein said control signal includes at least one pulse.

18. A crossbar exchange arrangement comprising a transmission medium including a controllable propagation speed material;

first means for inputting a first signal into said medium, to develop both a first interacting signal that travels in said medium in one direction and a corresponding first reference signal that travels in said medium in the opposite direction;

second means for inputting a second signal into said medium, to develop both a second interacting signal that travels in said medium in one direction and a corresponding second reference signal that travels in said medium in the opposite direction;

means for injecting a control signal into said medium, that travels through said medium in the direction of said first and second interacting signals with the timing of said control signal in relation to said first and second interacting signals, controlled to traverse said first and second interacting signals by said control signal while said first and second interacting signals are traveling through said medium;

means for combining each reference signal after its travel through said material with its corresponding interacting signal after its travel through said medium, to form first and second combined signals; wherein when said control signal is absent, said first combined signal appears at a first output means and second combined signal appears at a second output means; wherein when said control signal is present, said first combined signal appears at said second output means and said second combined signal appears at said first output means; and wherein said first and said second signals have different wavelengths and are inputted substantially at the same time to said arrangement.

19. The arrangement of claim 1 wherein said first and second signals have a first polarization and said control signal has a second polarization.

20. An optical crossbar exchange arrangement comprising a Sagnac switch including an input port for receiving an optical signal, an output port for outputting an optical signal, and a control port for receiving control signal;

a first coupler for coupling a first input signal to said Sagnac input port and for coupling a first output signal from said Sagnac input port;

a second coupler for coupling a second input signal to said Sagnac output port and for coupling a second output signal from said Sagnac output port; wherein when said control signal is absent, said first input signal produces said first output signal and said second input signal produces said second output signal and wherein when said control signal is present, said first input signal produces said second output signal and said second input signal produces said first output.

* * * * *